March 14, 1967 P. R. HICKEY 3,309,676

DATA MASS MEMORY SYSTEM

Filed Dec. 10, 1963 3 Sheets-Sheet 1

INVENTOR:
Paul A. Hickey
By [signature]
Attorney

March 14, 1967 P. R. HICKEY 3,309,676

DATA MASS MEMORY SYSTEM

Filed Dec. 10, 1963 3 Sheets-Sheet 2

INVENTOR:
Paul A. Hickey
By [signature]
Attorney

DATA MASS MEMORY SYSTEM

INVENTOR:
Paul A. Hickey
By [signature]
Attorney

United States Patent Office 3,309,676

Patented Mar. 14, 1967

3,309,676

DATA MASS MEMORY SYSTEM

Paul R. Hickey, Tujunga, Calif., assignor to General Precision, Inc., a corporation of Delaware Filed Dec. 10, 1963, Ser. No. 329,437
6 Claims. (Cl. 340—172.5)

The present invention relates generally to memory systems for use with electronic digital data processors, computers, and the like; and it relates more particularly to an improved data mass storage or memory system, which may be of the "content addressable" type, and which is intended to be used in conjunction with one or more data processors, computers, or the like, for the storage of large amounts of data.

The memory system of the present invention, as mentioned above, is a mass memory in which a vast amount of data can be stored in binary coded digital form. The memory system to be described is especially useful for shared computer applications, whereby one or more computers are provided with access to vast amounts of data; or for complex data processing applications to enable numerous and varied reports to be made available on an almost instantaneous basis.

The content addressable capabilities of the memory system of the embodiment to be described are such that desired data may be selected from the memory by addressing the particular data itself, as opposed to the need to address a particular memory track and sector location in the memory. This content addressable capability obviates the usual bookeeping tasks of maintaining address table references and of updating the references from time to time.

The memory system of the invention, in the embodiment to be described, utilizes one or more rotatable magnetic memory discs as the storage medium. When several discs are used, they may be mounted in spaced coaxial relationship on a common drive shaft.

The serial/parallel type of access to the magnetic memory disc is used in the embodiment to be described, and the following description is directed to the manner in which such a serial/parallel access system can be implemented to achieve the content addressing requirement of the system without sacrificing other desirable capabilities.

An object of the invention, therefore, is to provide an improved memory system which is capable of storing a large amount of binary coded digital data in a relatively small amount of space, so that the structural unit embodying the memory system occupies a low physical volume.

Another object of the invention is to provide such an improved memory system which lends itself particularly to content addressing techniques without adversely affecting other desirable capabilities of the system.

A further object of the invention is to provide such an improved memory system which is economical in its construction so as to exhibit a low cost capability per bit of binary data stored in the system.

A still further object of the invention is to provide such an improved memory system which exhibits an extremely short access time, so that any desired data may be quickly obtained from the memory system.

Yet another object of the invention is to provide such an improved mass memory system which is adaptable to modular construction, so that system flexibility to a large range of application requirements may be achieved.

A feature of the invention is the provision of such an improved memory system which is conceived and constructed so that data can be stored therein in an interlaced manner, thereby to permit the use of maximum bit density in the memory storage medium and maximum speed of the medium; and yet to hold the data rate to practical limits, for example, of the order of 15 kilocycles to 1500 kilocycles by present standards.

Another feature of the memory system of the present invention is the provision of means for achieving a relatively fast "slew" rate during the searching interval so that any desired data block in the memory may be reached relatively quickly, and then to provide for an effective reduction in the reading rate during the actual transfer from the memory.

Another feature of the memory system of the present invention is the provision of means in the memory system for relieving the associated computer or data processor of many bookkeeping tasks, these tasks being performed in the memory system itself. Such tasks may include, for example, marking ("flagging") areas within the memory storage which are available to receive and store data, and other similar operations.

As mentioned above, the memory system of the invention has the feature of allowing required data to be specified by any degree of content, rather than by track and sector address. However, the fixed address type of search can be used, as a program option, if so desired, merely by providing a fixed address track on the memory medium, and by providing the usual associated fixed address search logic.

It follows, therefore, and will become more apparent as the description proceeds, that since any desired data block can be selected from the memory system of the invention on the basis of agreement between specified search criteria contained in a search register and the desired data block in the memory, it is unnecessary to have a fixed memory address for the data.

It also follows that if the memory location which previously contained a selected block of data is marked; a subsequent rewrite of the selected block after updating can be made at random in any one of the marked areas which first presents itself. The latter feature affords an extremely low disc latency, in addition to the advantages of the concomitant reduction in storage requirements and the elimination of any requirement for the processing of fixed address tables.

By way of example, it may be pointed out that a constructed embodiment of the invention has exhibited capabilites of storing over 120 million binary bits on a 6-disc unit. The constructed embodiment is content addressable. However, it can operate in a fixed address mode, at program option. The constructed system can scan portions of the stored records at a gross rate of 14.5 million bits per second. It has average read and write access times of 35 and 1 milliseconds respectively. The constructed embodiment is formed of expandable modular units, so that it can be assembled, with no loss in flexibility, to handle up to over 6.7 billion binary bits.

Other objects, features, and advantages of the invention will become apparent from a consideration of the following specification, when the specification is taken in conjunction with the accompanying drawings, in which.

Figure 1:
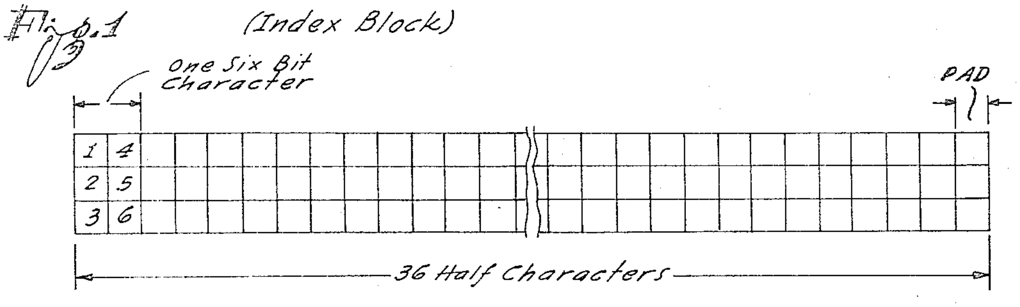
FIGURE 1 is a schematic representation of an "index block" utilized in the mass memory of the present invention.
Figure 2:
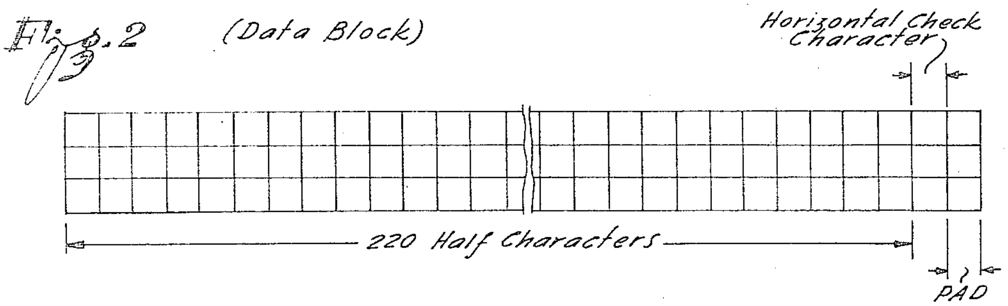
FIGURE 2 is a schematic representation of a "data block," likewise, utilized in the mass memory system of the invention.

The method of recording utilized in the system of the invention, as mentioned above, is a parallel/serial type. Each block of data is assumed to be composed of a plurality of six-bit alpha-numeric characters, as shown in FIGURES 1 and 2. The six-bit characters are serially recorded in parallel half-character groups of three bits each.

Each block of data is identified by an "index block" of, for example, thirty-six half characters, as shown in FIGURE 1. This index block represents a portion of the content identification of the corresponding data block, as opposed to the usual technique of a fixed address identification.

As shown in FIGURE 1, the index block is composed of thirty-six half characters, each having three parallel bits. The thirty-seventh half character is a pad, or spacer, which serves to separate the index block from the next succeeding index block on the memory disc, as will be described.

Each index block of FIGURE 1 has a corresponding data block, such as shown in FIGURE 2. The data block is also recorded in a serial parallel manner, and it is composed of, for example, 220 three-bit half characters. In each instance, and in order to preserve recording space, the seventh or parity bit of each alpha-numeric character is stripped off, and these are replaced by a single three-bit horizontal check-character or, "hash-total," such as shown in FIGURE 2. Each data block is likewise terminated by a pad, or spacer, half character, to separate it from the next suceeding data block on the magnetic memory disc.

It is to be understood, of course, that the particular format shown in FIGURES 1 and 2 is variable. The degree of parallelism merely serves to adjust the data transfer rate between limits, while the number of track sets provides the fast slew, as will be described.

Figure 3:
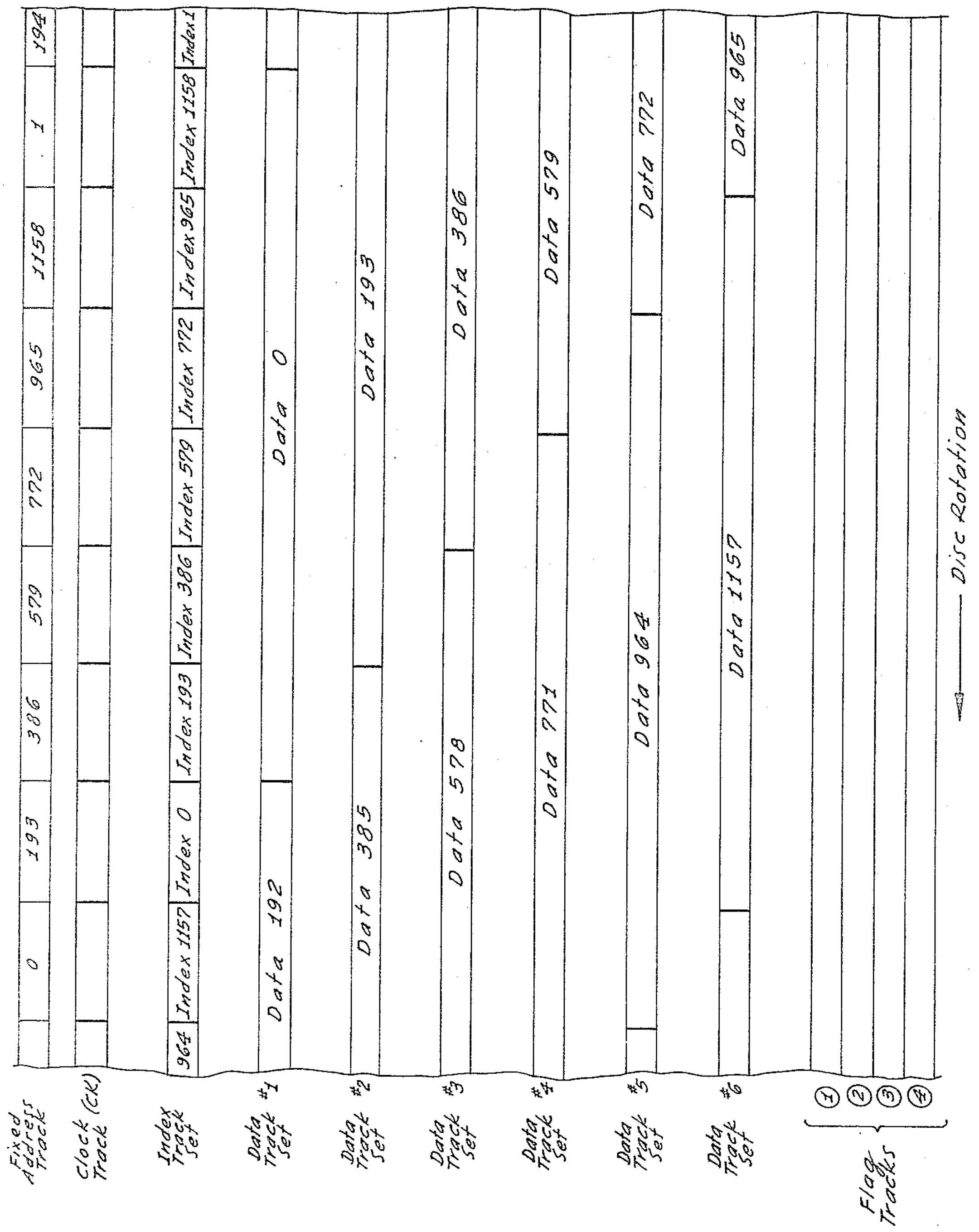
FIGURE 3 is a fragmentary, schematic representation of a magnetic memory disc, and of the manner in which information is stored on the disc, in the mass memory system of the invention.

To achieve the feature of a fast slew rate and a slower data transfer rate, the data records are written into the memory disc across two or more sets of selectable data tracks, as shown in FIGURE 3. This is in contradistinction to the usual prior art recording process in which an entire block is written into a selected track in the memory medium by the same set of selected heads and for the duration of the block.

Instead of the above mentioned usual prior art practice, and in accordance with the concepts of the present invention, the index portion (FIGURE 1) of a particular data block is written into the index track set of FIGURE 3. This set, in the illustrated embodiment, includes three tracks, so that the three-bit half characters of FIGURE 1 may be written into the memory in parallel across the three tracks, and serially along the tracks as the disc rotates. The data blocks of FIGURE 2, on the other hand, are written into the memory medium in individual three-track data track sets, as shown in FIGURE 3, in an inter-laced manner.

To write the records on the memory disc in a track interlaced manner, as shown in FIGURE 3, requires both a closed clock track (CK), and a definition of a minimum block of data to be read or transferred. This minimum block size in the particular embodiment under consideration comprises 256 half characters, as shown in FIGURES 1 and 2. The block size must be constant for any one system. However, this is not a program restriction, because multiple block transfers may be specified, for varying record length. The use of interlace recording shown in FIGURE 3, requires the use of pad or spacer bits, as described in FIGURES 1 and 2, between the subsequent record blocks on the memory disc.

It will be appreciated that the index portions of each block are recorded successively in the index track set of FIGURE 3. During the writing mode of operation, the first eighteen characters of each record, corresponding to the index block of FIGURE 1, are written into the index track set. Then, appropriate logical switching provides for recording the remaining 110 characters of the record, corresponding to the data block (FIGURE 2) in one of the six data track sets shown in FIGURE 3.

The writing operation proceeds, for example, from record 0 to record 1 in the particular embodiment. The index block portion of record 0 is written in the index track set; and then the data block portion of that record is written, without interruption in the data track set No. 1, as shown.

Following the writing of the data record 0 into the disc memory, the data record 1 is then written into the memory. This latter writing process commences with the recording of the index block 1 in the index track set, followed by the recording of the data block 1 in a selected one of the data track sets 1–6.

Following a complete revolution of the disc, the second set of records are written in an interlaced manner, starting at the index 193, and continuing on to the index 385. Then, in a further interlaced manner, the blocks 386–578 are recorded, and so on.

In the above described manner, the complete band of data blocks can be recorded in the index track set illustrated in FIGURE 3, and in the six data sets in an interlaced manner, and upon seven revolutions of the memory disc. Other data bands can be selected, as will be described, under the control of the associated data processor, and the present embodiment is assumed to include sixty of such bands. The various bands are usually selected in succession after an appropriate initial setting is established by a particular address signal from the associated data processor.

The net result of the format on the magnetic disc, as shown in FIGURE 3, is that in one revolution of the disc, it is possible by looking only at the index track set, to examine the first eighteen characters of all the data blocks stored on twenty-one tracks. In a constructed embodiment of the invention, one revolution of the memory disc requires 70 milliseconds. In that embodiment, the total amount of data in a particular band is 1350 blocks, or 1,036,800 binary bits, and the effective slew rate is then over 14.5 million bits per second.

During the aforementioned scanning of the index track set of FIGURE 3, the various index blocks successively read from the index track set are compared in a usual compare network with the processor-established content criteria. That is, the associated data processing equipment establishes in a search register, the content criteria of a desired block of data. Then, the index blocks successively read from the index track are compared in the compare network with the criteria in the search register until a "compare" condition is achieved.

When the "compare" condition occurs, the logical switching causes the reading from the mass memory to be switched from the index track set to a particular data track set corresponding to the index block which produced the "compare" condition, so that the remaining 110 characters of the particular data block creating the "compare" condition may be examined for content suitability. During the latter time, the slew rate of the system reduces to the data transfer rate of 750,000 half characters per second.

During the interval described in the preceding paragraph, when the search is switched from the index track set to a corresponding data block in a selected one of the data track sets, the index blocks in the index track set, missed when the system is sensing the data block, are marked or "flagged." This is achieved by bookkeeping circuits to be described, so that these missed index blocks may be checked on subsequent revolutions of the memory disc.

As mentioned above, the format of FIGURE 3 represents but one data band in sixty, insofar as the constructed embodiment of the invention is concerned. This particular band is selected, as is any other of the data bands, upon a suitable direction from the associated data processing equipment. The band selection system is shown in FIGURE 4.

Figure 4:
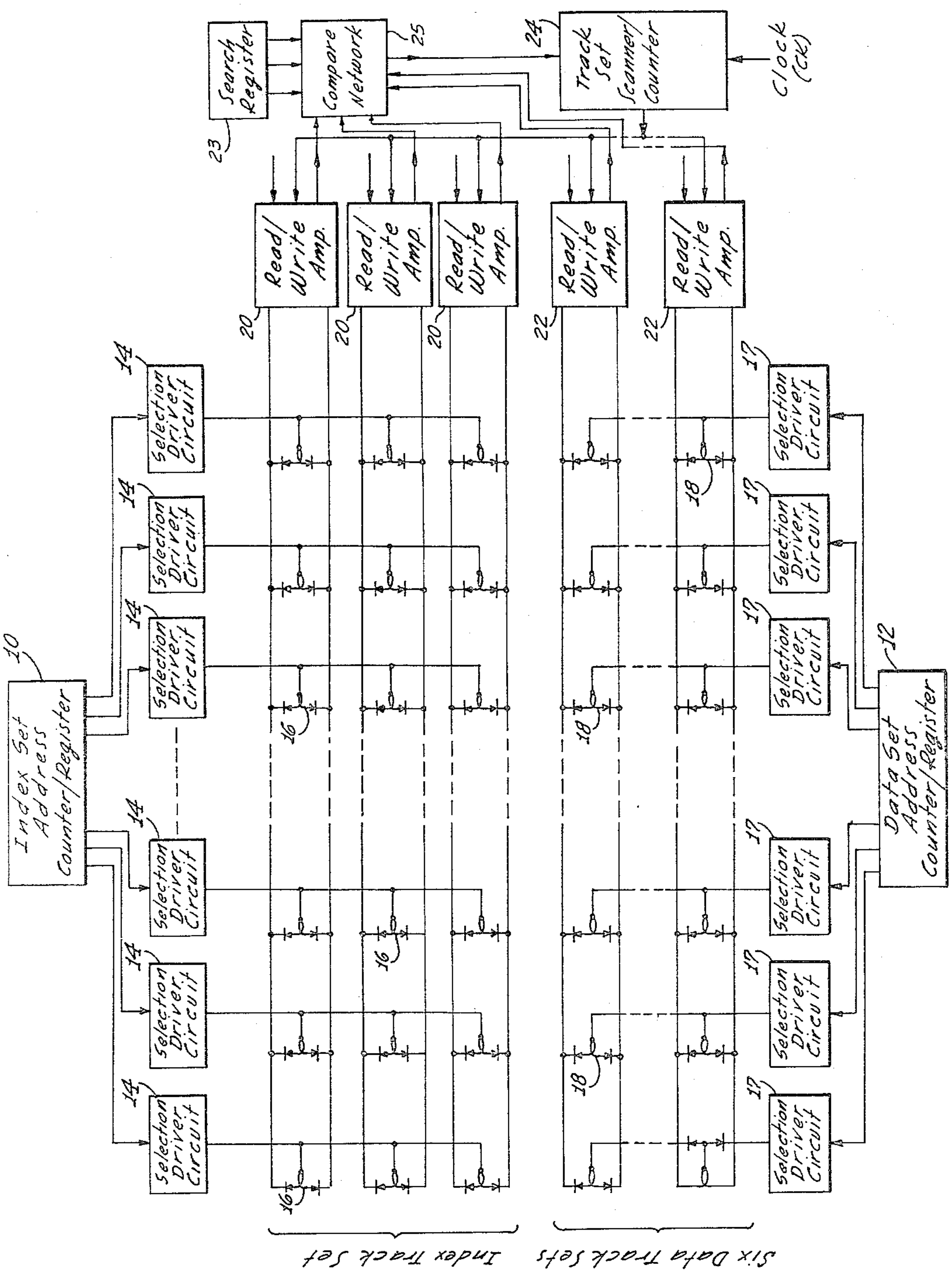
FIGURE 4 is a diagram, partly in block form and partly in circuit detail, illustrating the selection circuitry utilized in the mass memory system of the invention, and the manner in which information is written into the memory, and read therefrom.

The system shown in FIGURE 4 includes an index set address counter/register 10, and it includes a similar data set address counter/register 12. These two registers respond to addresses loaded into them from the associated data processing equipment, to specify which of the sixty data bands is to be first selected and then to provide for the successive selection of these bands.

In a constructed embodiment, each of the units 10 and 12 includes a simple binary counter, usual logic circuitry is coupled to the counter so that its initial state can be controlled by the address signals from the data processor. The counter is then caused to step from this initial state at selected intervals so that the system may be successively switched from one band to the next. Further logic responds to the different states of the counter so that appropriate control signals may be provided.

The counter/register 10 is coupled to a plurality of selection driver circuits 14 which, in turn, are connected to respective read/write electro-magnetic transducer heads 16. Likewise, the data set address counter/register 12 is connected to a plurality of similar selection driver circuits 17 which, in turn, are respectively connected to corresponding read/write electromagnetic transducer heads 18.

The read/write transducer heads 16 are magnetically coupled to the three-track index track sets in the different bands, such as the three-track index set described above in conjunction with FIGURE 3. Likewise, the read/write transducer heads 18 are magnetically coupled to the six three-track data track sets of the different bands, as described above.

The different read/write heads 16 are coupled through appropriate isolating diodes to corresponding read/write amplifiers 20. The heads 18 are coupled through appropriate isolating diodes to corresponding read/write amplifiers 22. The read/write amplifiers 20 and 22 are controlled by a track set scanner/counter 24.

The system of FIGURE 4 includes a search register 23 which receives content search criteria signals from the associated data processing equipment. This register is connected to a usual compare circuit 25, as are the read amplifiers 20 and 22.

As shown in FIGURE 4, a particular band address signal from the associated data processor specifies a desired one of the data bands for any particular operation. This selected data band consists, in the particular embodiment under consideration, of seven three-track sets, as shown. The aforesaid address signal is loaded into the index counter/register 10, and the identical address signal is loaded into the data counter/register 12.

The output of the counter in the index register 10 is decoded by the aforementioned logic circuitry to energize one of the sixty selection driver circuits 14, corresponding to the particular address loaded into the register 10. The activated selection driver circuit 14 produces an output which applies, for example, +20-volts to the center tap of the three selected index transducer heads 16. Thereafter, the counter progresses step-by-step so that successive ones of the driver circuits 14 may be activated.

At the same time, the identical address loaded into the data register 12 causes a corresponding selection driver circuit 17 to enable the selected data transducer heads associated with the corresponding six data tracks sets. This latter enabling, likewise, is achieved by applying, for example, +20-volts to the center tap of the selected read/write heads.

Each of the read amplifiers 20 is connected, for example, to sixty of the center tapped index track set read/write transducer heads 16, whereas the read/write amplifiers 22 are each connected to sixty of the center tapped read/write transducer heads 18. When any one of the read/write heads 16 or 18 has +20-volts applied to its center tap, instead of the normal −10-volts, the corresponding isolation diodes are forward biased, and the disc signal "1" or "0" (30 millivolt positive- or negative-going pulse) is applied to the corresponding read amplifier.

The read amplifiers 20 and 22 are constructed to combine a high common mode noise rejection characteristic of a differential output, with the reliability of a read strobe clock sampled output. A logical inhibit signal derived from the block 24 for example, normally locks each amplifier in a disabled reset state.

The write amplifiers are illustrated in the same blocks 20 and 22 as the read amplifiers, for purposes of simplicity. It is to be understood, of course, that the particular circuitry of these and the other units to be described herein is, in itself, well known. In fact, a variety of well known circuits can be used to accomplish the functions of the various components to be described.

The write amplifier portion of each of the blocks 20 and 22 is connected in parallel with the read amplifier portion across the associated read/write heads 16 and 18. The input to the write amplifiers is of the Ferranti complemented (phase modulated) type, and it is synchronized with a write strobe clock to insure uniformity of write amplifier switching.

Each of the write amplifiers may include, for example, a double-ended output stage, and this stage follows the input signal. The resulting output effectively grounds one or the other side of the selected write heads, so that the +20-volts on the center tap thereof, causes write currents to flow on one side or the other of the selected head. This current flow permits a modified Ferranti data patten to be recorded on the magnetic surface of the memory disc. A logic input to the write amplifiers from the block 24, for example, permits the writing to be optionally enabled or inhibited, even when the particular head itself has been selected.

The function of the selection driver circuits 14 and 17 is merely to respond to the logic level address decode signals as inputs from the respective counter/registers 10 and 12, and to supply a 20-volt positive bias on the center tap of the corresponding heads 16 or 18 in response thereto. These selection driver circuits further serve to hold a 10-volt negative bias on the read/write heads which are not enabled.

The head switching matrix of FIGURE 4 is usually of a relatively large size, and it usually requires a finite settling time, whenever a particular group of transducer heads 16 or 18 are enabled by a corresponding driver circuit 14 or 17. This settling time would normally cause an excessive waste space on the magnetic memory disc, and would seriously impede the flexibility of the system, if it were not possible to proceed from one data band to another without an interruption to await for the switched head/write heads to settle.

The aforementioned problem is overcome by the use of the separate index set address counter/register 10 which drives only the index track set. It follows, therefore, that when the reading or writing of the data from a particular selected data band proceeds to the last block in the band; then during the reading or writing of the last block, the index set address counter/register 10 can be switched to the next band. This means that the head selection circuitry can be in a settled condition, at the end of the reading or writing of the last block in the previous data band.

In the foregoing manner, the reading or writing in the memory system of the invention can proceed from the last block of any data band to the first block of the next selected data band without interruption. During the reading of the first index block of the following data band, the data set address can be shifted into the register 12, so that appropriate switching of the corresponding data read/write heads can be carried out and the latter selection circuitry will also be in a settled condition, so that information can be read or written, again without interruption.

For example, when the memory system of the invention is set to a random write mode of operation; this mode, once started may run from one data band into the next selected data band. For such an operation, during the time that the last 110 characters are being written in the last data block (No. 1349) of the current data band, the index counter/register 10 is incremented to the next count. This allows the selected selection driver circuit 14 for the index tracks of the second data band to settle before the corresponding write amplifier 20 is enabled logically to start the writing operation. Similarly, as soon as writing on the index tracks of the new data band has commenced, the counter/register 12 is incremented and has time to settle. During the read mode of operation of the system, the same technique allows data to be read continuously from data band to data band.

The above described operations, in conjunction with the bookkeeping data flags (to be described), improves the variable record length capability of the system, so as to enhance flexibility without sacrificing storage space The above described operations also reduce the main frame compilation and running time of the overall by relieving the associated data processing equipment of some bookkeeping detail. The operations also decrease the file access time.

The track set scanner/counter 24 is actuated by the clock pulses CK (FIGURE 3) which are derived from the magnetic memory disc, and also by an origin pulse on the disc (not shown). The counter 24 is a modulo 6 counter, in the embodiment under consideration, and it changes count every 18 characters to maintain synchronism with the successive block positions on the magnetic memory disc.

An appropriate register is included in the block 24. This register holds the count corresponding to a selected data block long enough to permit the 110 characters of the block to be read or written. This permits the counter to continue its modulo 6 count without interruption, so that synchronism is maintained with the memory disc.

The block 24 also includes appropriate logic which causes for example, a selected write amplifier 20 to be activated at the appropriate intervals for the inter-laced recording of the index blocks in the index track set of FIGURE 3. At the end of the recording of any particular index track block, the logic in the block 24 then sets a count in the associated register, so that the proper write amplifier 22 is activated for the remaining 110 characters of the block. This operation of the scanner/counter block 24 continues during the writing process, until all the blocks in the selected band have been recorded on the magnetic memory disc in the manner shown in FIGURE 3.

During the reading mode of operation of the system, the track set scanner/counter 24 first activates the read amplifiers 20 so that the index blocks of the selected band may be successively sensed. Then, when the compare circuit 25 indicates that certain criteria have been met, as established by a comparison with the contents of the search register 23, the counter 24 is caused to inhibit the reading by the read amplifiers 20, and to cause a selected read amplifier 22 to read out the corresponding data block from a selected one of the data track sets. During this latter interval, and as will be described, flag indications are inserted adjacent the index blocks of the index track set which are missed by the sensing of the aforementioned data block.

It will be appreciated that for a content addressable serial memory to be really effective, the system must enable data to be recalled from the magnetic memory disc for up-dating purposes by means of a successful comparison between the index data read from the memory disc, and the specified criteria held in the aforementioned search register 23; and then it should be possible to write the same data at random in available areas of the data band or group of data bands specified by the processor.

That is, for the system to be really effective, it must be constructed such that the data need not be stored in the same area of the memory medium after it has been up-dated, so that at no time need the program have any cognizance of a specific block address. To achieve the latter requirement, the memory must be marked in such a manner that when a data block is read from the memory for up-dating, or other purposes, the area from which it was read is caused to indicate that it is available to store subsequent new data.

However, problems arise in providing for the appropriate marking of the areas from which data has been read, and which are available to receive new data. For example, on a normal content search, the last character of a block of data read from the memory disc must often be checked before it can be established that the block meets all the search requirements. Then, it is normally too late to mark the area from which the record was derived as available for subsequent rerords. On the other hand, when a random write operation is being carried out, it is necessary to know prior to the first character of the block to be written into the memory, whether any particular area on the memory disc is obsolete and available to receive the new record.

Figure 6:
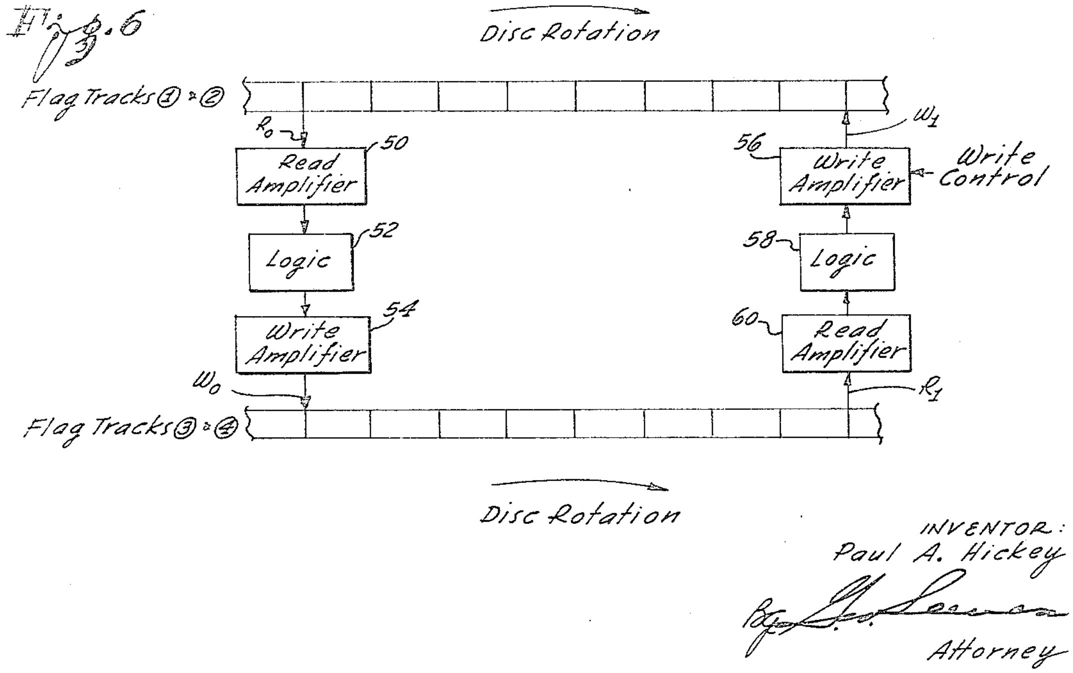
FIGURE 6 is a block representation of a dual delay line system which is utilized in the mass memory system for storing the flag bits.

To meet the requirements set forth in the preceding paragraph, the circuit technique of FIGURE 6 is utilized to provide bookkeeping markers on the memory medium, or flags as they will be referred to herein. These flags are recorded on the magnetic memory disc in a set of special delay line tracks shown in FIGURE 3, and designated therein as "flag tracks" 1–4.

Figure 5:
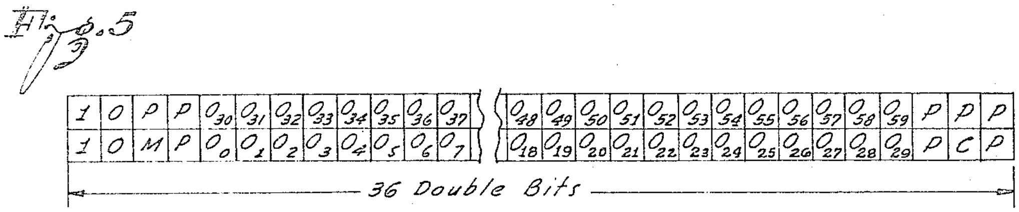
FIGURE 5 is a schematic representation of a block of "flag" bits utilized in the memory system, as will be described.

The flag tracks 1 and 2 are sensed in parallel, as are the tracks 3 and 4. The flags are recorded in each double set of flag tracks in a plurality of blocks, such as shown in FIGURE 5. These blocks correspond in length to the index block of FIGURE 1, and they include, for example, 36 double bits. They are recorded on the memory disc along the flag tracks in radial alignment with corresponding ones of the index blocks in the index track set of FIGURE 3.

The flag block of FIGURE 5 includes pad, or spacer, bits at each end. These bits are designated "P" and they signify no relevant data. They merely represent bits which permit bit changes to be made on either side thereof with no resultant interference with other information in the block.

The flag block of FIGURE 5 also includes a "missed record" flag, designated "M." This flag signifies a missed record, and it is designated "1" in the flag block when the corresponding data block of the data band being processed cannot be content checked because an overlapped record is being read. When such a bit is sensed on a subsequent revolution, the corresponding block can be checked. It will be observed that only a single "M" bit is necessary for the various bands, since it is used only when a particular band is being sensed.

The flag block also includes a "C" flag which signifies that a record in the current file has met the content search criteria, but has not been transferred to the data processor, either because the processor is busy or because a "count only" instruction has been executed. In either event, when the particular "C" bit in the flag block is marked "1," the corresponding record may be retrieved without again searching for it when the processor is ready to receive it. Again, only one "C" flag bit is needed for all the bands, because it is used only in conjunction with the sensing of a particular band.

The remainder of the flag block of FIGURE 5 includes bit positions for receiving different obsolete flags. Whenever a flag $O_0$–$O_{59}$, for example is set to 1, it indicates that the corresponding data block in the correspondingly designated band is obsolete, and can receive a block of data during a random write operation.

As indicated above, however, the corresponding obsolete bit in the flag block of FIGURE 5 cannot be marked as "1," so as to designate an obsolete position on the memory, until the entire block has been sensed from the memory. However, during the random write information, the fact as to whether any particular area is available for recording must be made known prior to the beginning of any particular block of data. In order to effectuate the abovementioned requirements, the flag track pairs 1, 2 and 3, 4 are intercoupled in the manner shown in FIGURE 6.

A pair of read heads $R_0$ are magnetically coupled to the tracks 1 and 2, and these read heads are coupled to a read amplifier 50. The output from the read amplifier 50 is applied to an appropriate logic circuit 52, the output of which is amplified in a usual write amplifier 54. The write amplifier 54 is coupled to a pair of write heads $w_0$, which, in turn, are magnetically coupled to the flag tracks 3 and 4 in radial alignment with the read heads $R_0$.

A further pair of read heads $R_1$ is displaced along the flag tracks 3 and 4 in the direction of rotation, by an amount corresponding, for example, to eight index blocks, and eight clock pulses CK of FIGURE 3. The pair of read heads $R_1$ is coupled to a read amplifier 60, which, in turn, is coupled through appropriate logic 58 to a write amplifier 56. The write amplifier 56 is coupled to a pair of write heads $w_1$ which are magnetically coupled to the flag tracks 1 and 2, and which are in radial alignment with the read heads $R_1$.

It is apparent, therefore, that the flag tracks 1 and 2 constitute a long delay line, in that information written into those tracks by the write heads $w_1$ extend around the entire memory disc, with the exception of the eight disc positions between the two heads. The flag tracks 3 and 4, on the other hand, constitute a short delay line, in that the flag information written into these latter tracks extends only between the write head $w_0$ and is subsequently read by the read heads $R_1$.

In the manner described above, position coding is used to store all the flags required, for example, for all 1350 blocks of each of sixty data bands in the two pairs of long and short magnetic memory delay lines. By recirculating the data from the long pair of delay lines, constituted by the flag tracks 1 and 2, through the read amplifier 50 and write amplifier 51, and then through the short pair of delay lines, constituted by the flag tracks 3 and 4, through the read amplifier 60 and write amplifier 56 and back into the long pair of delay lines, it is possible to read and modify any of the flag bits related to any specific block, both before the block has come under the data read/write heads, or after the block has passed the data read/write heads.

For example, the flags may be derived from the logic block 52, at a time when the corresponding data block is in position for sensing. Any one of these flags may be modified at that time, by an appropriately timed write control signal applied to the write amplifier 54.

In like manner, the same flags can be examined at the logic circuitry 58 after the corresponding block has been sensed, and any one of the flags can be then modified, prior to being written into the long delay line formed by the flag tracks 1 and 2, by an appropriately timed control signal applied to the write amplifier 56 from the data processor.

During the search mode of operation of the system of the invention, the search criteria register 23 is loaded by the associated data processor at the beginning of the mode, and then the index blocks of the selected data band are compared, character-by-character with the search data in the register. Unless a "compare" is indicated, the search on the current index block is terminated, and recommenced on the next index block on the magnetic disks. Provision may be made for specifying searches on character positions, or groups, over the entire 128 characters of a block, in any combination of greater than, less than, equal to, not equal to, or between specified limits. It is also possible to specify bit masking on individual bits of characters.

The invention provides, therefore, an improved mass memory storage system which is capable of storing a vast amount of data. A feature of the invention, as described above, is the fact that it may be content addressable, and can conduct searches at an extremely high speed.

While a particular embodiment of the invention has been described, it is apparent that modifications may be made. The following claims are intended to cover all such modifications which come within the scope of the invention.

What is claimed is:

1. A memory system including: a memory storage medium having a plurality of first tracks for the storage of first information representing index blocks of identifying information in successive locations in each of said first tracks, and having a plurality of groups of further tracks for the inter-laced storage of second information representing data blocks of information therein respectively corresponding to said index blocks; a plurality of first transducer units respectively coupled to respective ones of said first tracks; a plurality of groups of further separate transducer units respectively coupled to respective ones of said groups of further tracks; first switching circuitry coupled to said first transducer units for selectively activating such first transducer units; second switching circuitry coupled to said groups of further transducer units for selectively activating said groups; first control circuit means including a first address register for selectively activating said first switching circuitry in response to signals stored in said first address register; and second control circuitry independent of said first control circuitry and including a separate address register for selectively activating said second switching circuitry in response to signals stored in said second address register; and means for introducing a common address into said first and second address registers.

2. The memory system defined in claim 1 and which includes: a first plurality of read/write circuits respectively coupled to said first transducer units; and a further plurality of groups of read/write circuits respectively coupled to said groups of further transducer units.

3. The memory system defined in claim 2 and which includes circuitry coupled to said first plurality of read/write circuits for transferring said first information representing said index blocks with respect to a first transducer unit activated by said first switching circuitry, and coupled to said further plurality of groups of read/write circuits for transferring said second information representing said data blocks with respect to a group of said further transducer units activated by said second switching circuitry.

4. The memory system defined in claim 1 in which said memory storage medium includes a third track available for the storage of flag marker signals at pre-selected locations relative to said successive locations in said first tracks.

5. The memory system defined in claim 4 in which said third track includes first and second delay means for said flag marker signals, and circuit means intercoupling said delay means to permit said flag marker signals to be read and written at two distinct times with respect to the processing of said index data blocks.

6. The memory system defined in claim 4 in which said memory storage medium comprises a movable magnetic member, in which said third track includes at least two sub-tracks on said magnetic member, and which includes a first electromagnetic read head coupled to one of said two sub-tracks and a first electromagnetic write head coupled to the other of said two sub-tracks, and a second electromagnetic write head displaced along said one of said sub-tracks from said first read head in the direction of movement of said magnetic member, and a second electromagnetic read head displaced along the other of said sub-tracks from said first write head in the direction of movement of said magnetic member, first circuit means intercoupling said first read head and said first write head, and second circuit means intercoupling said second read head and said second write head.

References Cited by the Examiner

UNITED STATES PATENTS

| | | | |
|---|---|---|---|
| 2,771,596 | 11/1956 | Bellamy | 340—172.5 X |
| 3,156,897 | 11/1964 | Bahnsen | 340—172.5 |

ROBERT C. BAILEY, *Primary Examiner.*

P. L. BERGER, P. J. HENON, *Assistant Examiners.*